United States Patent [19]

McCormick

[11] Patent Number: 4,743,962
[45] Date of Patent: May 10, 1988

[54] METHOD OF CREATING A REPRESENTATION OF A COLORED IMAGE

[75] Inventor: Robert A. McCormick, Aloha, Oreg.

[73] Assignee: Tektronix, Inc., Beaverton, Oreg.

[21] Appl. No.: 59,310

[22] Filed: Jun. 8, 1987

[51] Int. Cl.[4] .............................................. H04N 1/46
[52] U.S. Cl. ......................................... 358/75; 358/78
[58] Field of Search ................ 358/75, 75 IJ, 78, 298, 358/283; 304/703

[56] References Cited

U.S. PATENT DOCUMENTS

| | | | |
|---|---|---|---|
| 4,035,837 | 7/1977 | Starck et al. | 358/78 |
| 4,319,267 | 3/1982 | Mitsuya et al. | 358/75 |
| 4,412,226 | 10/1983 | Yoshida | 358/75 IJ |
| 4,549,172 | 10/1985 | Welk | 340/703 |
| 4,688,031 | 8/1987 | Haggerty | 340/703 X |

*Primary Examiner*—James J. Groody
*Assistant Examiner*—E. Anne Faris
*Attorney, Agent, or Firm*—John Smith-Hill; Robert S. Hulse

[57] ABSTRACT

A visible representation of a colored image is created on a print-receiving area by resolving the colored image into p raster lines and resolving each raster line into q pixels, and creating a succession of sequences of digital words such that each word is associated with a pixel of the image and has one of n possible values, representing the color of the pixel. Consecutive words in each sequence of digital words are associated with adjacent pixels in a raster line of the image and consecutive sequences in the succession of sequences are associated with adjacent raster lines. First, for each of the n possible values of each digital word, a measure of the number of words that have that value is determined. Second, a set of the n possible values is selected, such that the number yielded in the first step for each value is not zero. Third, a subset of the selected set is identified such that pixels having the colors represented by the values in the subset do not appear adjacent each other in the image. One of m color levels (where m is an integer less than n) is assigned to at the values in the subset. A printing device creates a representation on the print-receiving area of the colored image such that all the pixels of the image having the colors represented by the values in the subset are rendered by a single one of the m color levels.

5 Claims, 1 Drawing Sheet

METHOD OF CREATING A REPRESENTATION OF A COLORED IMAGE

This invention relates to a method of creating a representation of a colored image.

BACKGROUND OF THE INVENTION

The effectiveness with which an engineering workstation can be used often depends on the user having access to peripheral devices such as printers. If a printer is shared among several workstations, or a printer associated with a given workstation is in need of repair, the user of the workstation might not be able to obtain promptly a printed copy of the image created using the workstation. Frequently, it is preferable to have a prompt printed copy of somewhat inferior quality than wait for access to a printer that is able to provide a copy of higher quality.

SUMMARY OF THE INVENTION

In accordance with a preferred embodiment of the present invention, a visible representation of a colored image is created on a print-receiving area by resolving the colored image into p raster lines and resolving each raster line into q pixels, and creating a succession of sequences of digital words such that each word is associated with a pixel of the image and has one of n possible values, where n is a positive integer representing the color of the pixel. Consecutive words in each sequence of digital words are associated with adjacent pixels in a raster line of the image and consecutive sequences in the succession of sequences are associated with adjacent raster lines. First, for each of the n possible values of each digital word, a measure of the number of words that have that value is determined. Second, a set of the n possible values is selected, such that the number yielded in the first step for each value is not zero. Third, a subset of the selected set is identified such that pixels having the colors represented by the values in the subset do not appear adjacent each other in the image. One of m color levels (where m is an integer less than n) is assigned to the values in the subset. A printing device that resolves a print-receiving area into p lines and resolves each raster line into q color elements, with the pixels of the image being mapped to respective color elements of the print-receiving area, is employed to create a representation on the print-receiving area of the colored image such that all the pixels of the image having the colors represented by the values in the subset are rendered by a single one of the m color levels.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
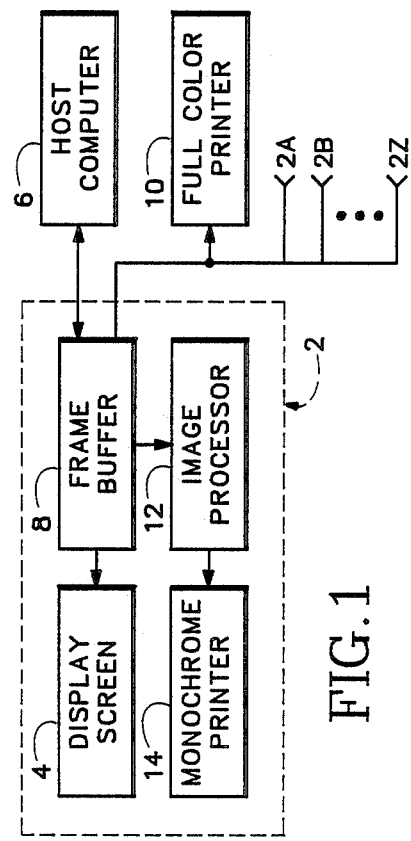
FIG. 1 is a block diagram illustrating the major components of a computer-aided design/computer-aided engineering system.

FIG. 1 illustrates a workstation 2, e.g. a computer-aided design/computer-aided engineering workstation, during use of which a colored image is created on the display screen 4 of a raster scan cathode ray tube. The colored image may be composed of up to 16 colors selected by the user from an overall set of 64 colors. Typically, the raster has 480 lines, and each line may be resolved into 640 pixels. The image is created using data and programs resident on a host computer 6, and at any given time during creation of the image, data representing the form of the image as it then exists is stored in a frame buffer 8. If the image contains 480×640 pixels, the frame buffer stores 300K words organized in a 480×640 array. Each word has six bits, although for a given working set of 16 colors only 16 different word values (corresponding to four bits) are possible.

The workstation is connected to a full color printer 10. The printer is able to use the data stored in the frame buffer to generate a printed copy of the image on the screen 4, containing the same number of colors as are present in the image on the screen 4, i.e. any of sixteen colors in a working set selected from an overall set of 64 colors. The printer may be, for example, an ink jet printer. In any event, the print head is able to address a rectangular array of color cells that map one-to-one to the pixels of the image on the screen 4 of the workstation.

The full color printer 10 serves not only the workstation 2 but also other workstations 2A–2Z, which are not specifically shown. Accordingly, the printer 10 is not always available for use in conjunction with the workstation 2. To alleviate this inconvenience, the workstation incorporates an image processor 12 and a monochrome printer 14. The printer 14 is a dot matrix printer that is able to address a rectangular array of grey scale elements which map one-to-one with the pixels of the image shown on the screen 4. Each grey scale element may be composed of only one pixel, but in general it would comprise a square array of four or nine pixels. Through use of more than one pixel in each grey scale element and known dithering techniques, it is possible to achieve multiple saturation levels in a printed copy produced using the printer even though each pixel has only two possible saturation levels. In general, the number of different saturation levels that can be defined for a given grey scale element using the monochrome printer 14 is less than the number of colors in the working set defined for the printer 10. The processor is used to select the grey scale levels that will be used to represent the different colors that appear in the image on the screen 4.

In order to determine how the grey scale levels that can be created using the printer 14 should be used to represent the colors of the image, the image processor 12 analyzes the data stored in the frame buffer and compiles statistics. In general, it is not necessary to examine every word stored in the frame buffer, and the contents of the frame buffer are instead sampled. Each sample consists of the words representing two adjacent raster lines of the image. Sampling must be carried out at a spatial frequency that is sufficiently high to avoid loss of detail that one wishes to portray in the printed copy. In accordance with the sampling theorem, if one wishes to portray spatial frequencies up to thirty cycles/image height, i.e. details that occupy sixteen or more raster lines, a sample should be taken every eight raster lines.

Figure 2:
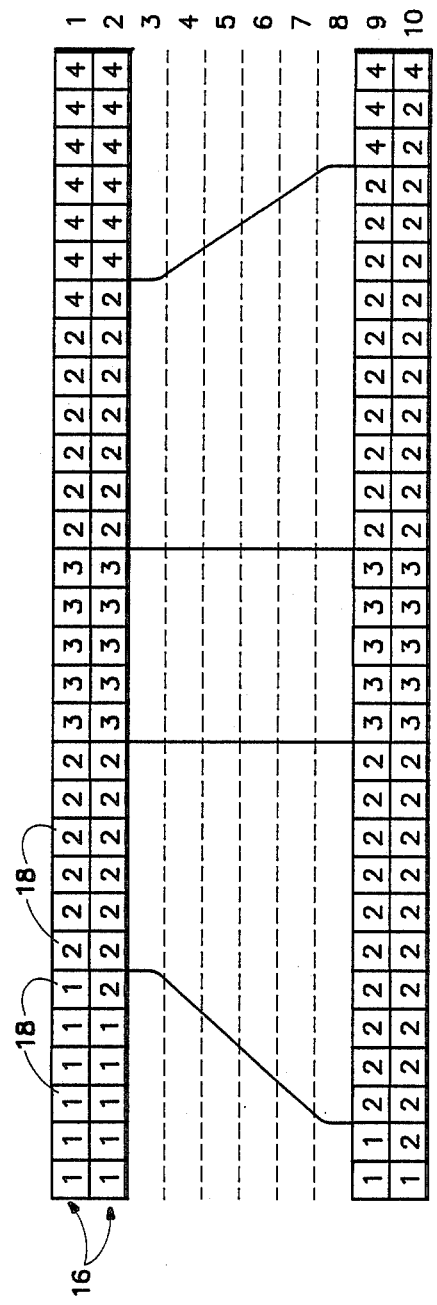
FIG. 2 illustrates schematically a portion of the image displayed on the screen of a workstation that is included in the FIG. 1 system.

FIG. 2 illustrates diagrammatically a portion of the image on the screen 4 and represented by data stored in the frame buffer 8. The image is composed of raster lines 16, and each raster line 16 is composed of pixels 18. For the sake of clarity, the pixels 18 are specifically illustrated only with respect to two raster lines in each row of eight adjacent lines, i.e. the raster lines designated 1, 2, 9 and 10. The colors of the pixels in raster lines 1, 2, 9 and 10 are indicated with references C1, C2, C3 and C4. As pointed out previously, the number of possible colors is sixteen, but for the sake of clarity only four colors are represented. The actual colors are irrelevant.

Two statistical arrays are generated. The first array (CF[Ci]) represents the number of times the color Ci appears in the two lines of a sample, and a second array (CA[Ci][Cj]) represents the number of times a color Ci in the first line is adjacent to a color Cj immediately below it or to the right of it in the same line. Table I indicates the values of CF for raster lines 1 and 2 and for raster lines 9 and 10, whereas Table II indicates the values of CA for the same lines.

TABLE I

| Lines 1 and 2 | Lines 9 and 10 | Total |
|---|---|---|
| CF[C1] = 11 | CF[C1] = 3 | CF[C1] = 14 |
| CF[C2] = 26 | CF[C2] = 43 | CF[C2] = 67 |
| CF[C3] = 10 | CF[C3] = 10 | CF[C3] = 20 |
| CF[C4] = 13 | CF[C4] = 4 | CF[C4] = 17 |

TABLE II

| Lines 1 and 2 | Lines 9 and 10 |
|---|---|
| CA[C1][C2] = 3 | CA[C1][C2] = 3 |
| CA[C1][C3] = 0 | CA[C1][C3] = 0 |
| CA[C1][C4] = 0 | CA[C1][C4] = 0 |
| CA[C2][C1] = 0 | CA[C2][C1] = 0 |
| CA[C2][C3] = 2 | CA[C2][C3] = 2 |
| CA[C2][C4] = 2 | CA[C2][C4] = 2 |
| CA[C3][C1] = 0 | CA[C3][C1] = 0 |
| CA[C3][C2] = 2 | CA[C3][C2] = 2 |
| CA[C3][C4] = 0 | CA[C3][C4] = 0 |
| CA[C4][C1] = 0 | CA[C4][C1] = 0 |
| CA[C4][C2] = 1 | CA[C4][C2] = 2 |
| CA[C4][C3] = 0 | CA[C4][C3] = 0 |

In order to produce symmetry, CA[Ci][Cj] and CA[Cj][Ci] are replaced by CA*[Ci][Cj], where CA*[$C_i$][$C_j$]=CA[Ci][Cj]+CA[Cj][Ci], yielding the information contained in Table III.

TABLE III

| Lines 1 and 2 | Lines 9 and 10 | Total |
|---|---|---|
| CA*[C1][C2] = 3 | CA*[C1][C2] = 3 | CA*[C1][C2] = 6 |
| CA*[C1][C3] = 0 | CA*[C1][C3] = 0 | CA*[C1][C3] = 0 |
| CA*[C1][C4] = 0 | CA*[C1][C4] = 0 | CA*[C1][C4] = 0 |
| CA*[C2][C3] = 4 | CA*[C2][C3] = 4 | CA*[C2][C3] = 8 |
| CA*[C2][C4] = 3 | CA*[C2][C4] = 4 | CA*[C2][C4] = 7 |
| CA*[C3][C4] = 0 | CA*[C3][C4] = 0 | CA*[C3][C4] = 0 |

The statistical arrays are generated at the time the data representing an image is loaded into the frame buffer. When it is desired to use this data to print a copy using the monochrome printer 14, the statistics are used to rank the colors in order of frequency and to assign the colors to partition arrays. In order to do this, the colors are ranked from high to low in order of decreasing values of CF. The statistics are used to select partitions (sets of colors) that have no adjacencies). Thus, a partition array (PA[]) is established by the processor and the processor initially indicates that each color is not assigned to a partition. The highest ranked color (i.e. the color for which the value of CA is highest) is assigned to partition 1. Using the adjacency information, a determination is made as to whether the second highest ranked color can be placed in partition 1. If the values of CA* for the two highest ranked colors are zero, then the second color is placed in partition 1, but if not it is placed in partition 2. The color frequency table is then examined to identify the third highest ranked color and the adjacency table is examined. If there are two colors in partition 1, and CA* for the third color and each of the two highest ranked colors is zero, the third color is placed in partition 1, but if CA* for the third color and either of the two highest ranked colors is non-zero, the third color is placed in partition 2. If there is only one color in partition 1 (and there is therefore one color in partition 2), and CA* for the color in partition 1 and for the third color is zero, the third color is placed in partition 1. If CA* for the color in partition 1 and the third color is non-zero, the third color is not placed in partition 1, and if CA* for the color in partition 2 and the third color is zero, the third color is placed in partition 2; if CA* for color in partition 2 and the third color is non-zero, the third color is placed in partition 3. The procedure is repeated until all the colors for which CF is not equal to zero have been assigned to a partition.

Applying this procedure to the information in Tables I and III, it will be seen that, for the two samples that are represented, the colors are ranked (from highest to lowest) in the order C2, C3, C4, C1. The color C2 is placed in partition 1. The value of CA*[C2] [C3] is 8, and therefore the color C3 is placed in partition 2. CA*[C2][C4] is 7 and CA*[C1][C2] is 6, but CA*[C3][C4] and CA*[C1][C3] are both zero, and therefore the colors C4 and C1 are placed in partition 2.

When all the colors that appear in the image have been assigned to a partition, the processor receives the data stream representing the entire image from the frame buffer and creates a modified data stream which is used to drive the monochrome printer. In particular, on receiving from the frame buffer a word that represents a color assigned to partition 1, the processor places in the data stream to the monochrome printer the word that causes the monochrome printer to print a gray scale element at the lowest saturation level, and on receiving a word representing a color that has been assigned to partition 2 the processor applies to the monochrome printer the word that causes the monochrome printer to print the next more saturated gray scale element. Similarly, for each digital word received from the frame buffer and representing a color assigned to a specific partition, the processor generates and applies to the monochrome printer the digital word that causes the printer to print a gray scale element of the corresponding level in its range of possible saturations.

The number of gray scale levels that can be printed, and consequently the partitions that can be accommodated, depends on the number of dither patterns that can be generated by the monochrome printer. Although, for example, using a gray scale element composed of four pixels there are five possible saturation levels, in practice it might not be possible to generate more than four visually distinct saturation levels and therefore only four distinct partitions could be supported. If the processor assigned the colors of the image to more than four partitions, the fourth and all subsequent partitions would be printed with the same gray scale, i.e. 100% saturation, and would not be visually distinguishable on the basis of gray scale.

It will be appreciated that the present invention is not restricted to the particular method that has been described and illustrated, and that variations may be made therein without departing from the scope of the invention as defined in the appended claims and equivalents thereof. For example, instead of using a monochrome printer and assigning different gray scales to the different partitions, a limited color printer may be employed and different colors assigned to the different partitions. Even low cost color printers are able to produce eight colors (or more with dithering) and accordingly are able to support at least eight partitions. In assigning colors to the partitions, favorable results will generally be obtained if pure colors are assigned to the lower numbered partitions and increasingly dark or inky colors assigned to the higher numbered partitions. Dithering has the disadvantage that it necessitates an increase in picture size and results in a loss of resolution, and increases the time taken to generate the picture. Therefore, it is desirable to keep the number of partitions to a minimum. If the number of printable colors is greater than the number of partitions, a partition may be divided into portions each containing one or more color, and a different printable color may be assigned to each portion so as to restore information that was lost due to partitioning and to allow colors that are suitable for printing to be chosen.

Details of conventional operations have been omitted from the foregoing description of an embodiment of the invention. For example, the time taken for the image processor 12 to generate the data stream that is used to drive the monochrome printer 14 can be reduced substantially using known encoding schemes, such as pixel packing and runlength encoding. It is not intended that methods in which such conventional operations are performed be excluded from the scope of the claims.

The invention is not restricted to the generation of a visible representation of a colored image and may be used to generate a representation that can be sensed otherwise than visually, e.g. through the sense of touch.

The invention is not restricted to any particular method of sampling the image stored in the frame buffer, and indeed it is not essential that the image be sampled. In particular, the statistics could be generated by examining each pixel and all the adjacent pixels, but the time taken to generate the statistics could be much greater than if the image were sampled.

I claim:

1. A method of creating a representation of a colored image on a sensation-receiving member using a sensation-generating device that resolves the sensation-receiving member into a plurality of raster lines and resolves each raster line into a plurality of elementary areas and selectively applies one of m different sensation levels, where m is a positive integer, to each of said elementary areas, said method comprising the steps of:

(a) resolving the image into a plurality of raster lines and resolving each raster line into a plurality of pixels, each pixel being adjacent to at least one other pixel in its raster line and adjacent to at least one pixel in each adjacent raster line, and creating a succession of sequences of digital words in which each word is associated with a pixel of the image and has one of n possible values, where n is a positive integer greater than m, representing a color of the pixel, consecutive words in each sequence being associated with adjacent pixels in a raster line and consecutive sequences in said succession being associated with adjacent raster lines, and each pixel corresponding in its location in the image to a location of one of said elementary areas of the sensation-receiving member, (b) for each of the n possible values for each digital word, determining a measure of a number of words in the succession of sequences that have that value, (c) for a set of colors represented respectively by values such that the number yielded in step (b) for each value is not zero, determining a measure of a number of times respective pixels having those colors are adjacent each other in the image, (d) identifying a set of colors for which the number yielded in step (c) is zero and assigning one of said m different sensation levels to the colors of that set, and (e) using the sensation-generating device to generate a representation of the image by applying said one sensation level at each elementary area of the sensation-receiving member of which the location corresponds to the location in the image of a pixel of which the color is represented by one of the colors in the set identified in step (d).

2. A method according to claim 1, wherein step (d) is executed by (i) determining the color for which the number yielded in step (b) is a maximum, hereinafter referred to as a "first" color, and assigning a first sensation level to the first color, (ii) determining the color for which the number yielded in step (b) is a next highest, hereinafter referred to as a "second" color, (iii) if the number yielded in step (c) for the first and second colors is zero, assigning the first sensation level to the second color whereas if the number yielded in step (c) for the first and second colors is not zero, assigning a second sensation level to the second color, (iv) determining the color for which the number yielded in step (b) is a third highest, hereinafter referred to as a "third" color, and (v) if the number yielded in step (c) for the first and second colors is zero and the numbers yielded in step (c) for the first and third colors and for the second and third colors are both zero, assigning the first sensation level to the third color, whereas if the number yielded in step (c) for the first and second colors is not zero and the number yielded in step (c) for the first and third colors is zero, assigning the first sensation level to the third color, if the number yielded in step (c) for the first and second colors is not zero and the number yielded in step (c) for the second and third colors is zero, assigning the second sensation level to the third color, and if the numbers yielded in step (c) for the first and second colors, for the first and third colors and for the second and third colors are all not zero, assigning a third sensation level to the third color.

3. A method according to claim 1, wherein each of said m sensation levels is a color.

4. A method according to claim 1, wherein each of said m sensation levels is a color, hues of the respective colors being the same and saturations being different.

5. A method according to claim 1, wherein each of said m sensation levels is a color, and hues of the different colors are different.

* * * * *